US007130787B1

(12) United States Patent
Noury et al.

(10) Patent No.: US 7,130,787 B1
(45) Date of Patent: Oct. 31, 2006

(54) FUNCTIONAL REPLICATOR OF A SPECIFIC INTEGRATED CIRCUIT AND ITS USE AS AN EMULATION DEVICE

(75) Inventors: Sghaier Noury, Antibes (FR); Tristan Bonhomme, Antibes (FR); Pascal Jullien, Vence (FR)

(73) Assignee: Europe Technologies S.A., Sophia Antipolis (FR)

( * ) Notice: Subject to any disclaimer, the term of this patent is extended or adjusted under 35 U.S.C. 154(b) by 1078 days.

(21) Appl. No.: 09/698,247

(22) Filed: Oct. 30, 2000

(30) Foreign Application Priority Data

Jun. 16, 2000  (EP)  .................................. 00480051

(51) Int. Cl.
*G06F 9/455* (2006.01)
(52) U.S. Cl. ........................... 703/28; 703/24; 703/27; 714/28; 716/3; 717/134
(58) Field of Classification Search ................ 711/103, 711/227; 716/1–21; 712/36, 41; 703/23, 703/28, 27, 15, 24; 714/29, 28; 717/128, 717/134

See application file for complete search history.

(56) References Cited

U.S. PATENT DOCUMENTS

| 5,021,996 | A | * | 6/1991 | Watanabe | 714/29 |
| 5,321,828 | A | * | 6/1994 | Phillips et al. | 703/28 |
| 5,339,262 | A | | 8/1994 | Rostoker et al. | 716/4 |
| 5,572,655 | A | | 11/1996 | Tuljapurkar et al. | 345/519 |
| 5,572,710 | A | * | 11/1996 | Asano et al. | 703/15 |
| 5,710,934 | A | | 1/1998 | Bona et al. | 714/724 |
| 6,075,941 | A | * | 6/2000 | Itoh et al. | 717/128 |
| 6,477,683 | B1 | * | 11/2002 | Killian et al. | 716/1 |
| 6,668,242 | B1 | * | 12/2003 | Reynov et al. | 703/28 |

OTHER PUBLICATIONS

Putman, J. general Framework for Fault Tolerance from ISO/ITU Reference Model for Open Distributed Processing (RM-ODP), Proceedings of the IEEE International Workshop on Object-Oriented Real-Time Dependable Systems, Nov. 1999, pp. 111-118.*
Poole et al., I. Combining Functional and Object-Oriented Programming Methodologies in a Large Commerical Application, IEEE 1998 Iternational Conference on Computer Languages, May 1998, pp. 111-117.*

* cited by examiner

*Primary Examiner*—Russell Frejd
(74) *Attorney, Agent, or Firm*—James C. Lydon

(57) ABSTRACT

A real time functional replicator (10) of a specific integrated circuit comprised of a processing unit and peripherals in order to perform specific digital and/or analog functions controlled by specific software, this specific integrated circuit being designed to be incorporated into a specified application board. Such a device includes a processing module (12) that is functionally identical to the processing unit of the specific integrated circuit, a plurality of peripheral modules (14, 16, 18) each able to implement one or more digital and/or analog functions, each of the functions being able to be selected separately, and function interconnection means (20) for establishing the connections between the processing module and one ore more digital and/or analog functions located in at least one of the peripheral modules which are identical to the specific functions of the specific integrated circuit, such that the replicator behaves identically to the specific integrated circuit when the specific software is run.

15 Claims, 4 Drawing Sheets

FUNCTIONAL REPLICATOR OF A SPECIFIC INTEGRATED CIRCUIT AND ITS USE AS AN EMULATION DEVICE

TECHNICAL FIELD

The present invention relates generally to the prototyping, the development and the emulation of specific integrated circuits intended to be incorporated in application boards and relates in particular to a functional replicator of a specific integrated circuit and its use as an emulation device when the integrated circuit is incorporated into an application board.

BACKGROUND ART

For a long time, the technique of silicon-based integrated circuits, which has benefited from increasingly widespread miniaturization, was dominated by so-called "standard" integrated circuits based on a central processing unit (CPU) or a microprocessor. Over the last few years, the new trend has been to use microprocessor core-based application-specific integrated circuits (ASIC) using the complex instructions set computer (CISC) or the reduced instructions set computer (RISC). Three problems occur when developing integrated circuits, whether the latter are standard or specific: emulation, which consists in replacing the integrated circuit or the (hip in the final application by an emulation device performing the same functions as the integrated circuit, prototyping which consists in obtaining a prototype of the future integrated circuit, and development stage consisting in testing both the hardware and the application software and possibly performing debugging operations if problems are encountered.

The conventional approach for the emulation of integrated circuits has suffered an underlying assumption that is considered still today as an unchanging truth. The assumption is that an integrated circuit or a monolithic chip can be emulated only by another integrated circuit, that is to say, another monolithic chip that contains at least all of the functions contained in the integrated circuit that is to be emulated. The chips used for the emulation process generally contain a set of functions that were made accessible to the outside by extending the chip's inputs/outputs. These chips thus enable the emulation of all integrated circuit having functions that constitute a sub-assembly of the set of functions of the chip used for the emulation. Such chips which form the basis of the conventional emulation were indifferently referred to as the SE chip, Bound out chip, DEV chip, Emulation chip, Super chip or Piggy-Back.

Unfortunately, this conventional approach has a major drawback. As the emulation chip has only a given set of functions, it can only be used to emulate a limited number of integrated circuits. As a result, the smallest modification of the integrated circuit, other than memory size needed for the requirements of the application, may require that a new emulation chip be developed. It is thus usual to wait more than a year for an emulation circuit to be developed in order to be able to proceed with the emulation of an integrated circuit resulting from a modification of an integrated circuit that already exists, as the implementation of a new integrated circuit can only take place after its emulation circuit has been validated. This need to develop a new emulation circuit practically every time has made the development of integrated circuits very difficult and expensive, whether they are new or whether they are derived from existing integrated circuits. Furthermore, this problem has become crucial owing to the continued increase of specific integrated circuits, because it has become necessary to develop new emulation circuits very rapidly in order to meet the growing needs of specific applications and the rapid development of applications.

In order to solve the abovementioned problem, it was proposed to add to the emulation circuit a FPGA type external programmable logic array in order to incorporate a few additional functions. This solution is not adequate when a new specific integrated circuit must be created containing several peripheral functions which must be emulated in real time as the access to these functions is made by the external bus and not by the internal bus and thus at a much lower speed. Moreover, such a solution is totally inoperative when analog functions must be added to the integrated circuit.

As far as the prototyping and development of an integrated circuit are concerned, the existing solutions consist in using a set of separated boards representing the integrated circuit to be manufactured, or in using an emulation circuit previously mentioned to which one or more FPGA type programmable arrays integrating the required functions are added. This leads to making only prototypes which are much too slow and which do not represent the integrated circuit in real time or which are very close to the emulation circuit, thereby limiting the performance and the possibilities offered by these solutions due to the restricted number of functions which are traditionally found in a standard emulation circuit. It is clear that the need to develop an increasing number of specific integrated circuits for a perpetual influx of new applications and their growing complexity has created a crucial need to have rapid and efficient development and prototyping devices.

SUMMARY OF THE INVENTION

The main object of the invention is thus to provide a functional replicator of a specific integrated circuit designed to emulate an integrated circuit within a specific application.

Another object of the invention is also to provide a functional replicator of a specific integrated circuit that can be used as a prototyping device for the integrated circuit.

Yet another purpose of the invention is also to provide a functional replicator of a specific integrated circuit that can be used as a development platform for the integrated circuit.

The invention relates therefore to a real-time functional replicator of a specific integrated circuit consisting of a processing unit and peripherals for performing specific digital and/or analog functions under the control of specific software, this specific integrated circuit being designed to be incorporated into a given application board. The device includes a processing module which is functionally identical to the processing unit of the specific integrated circuit, a plurality of peripheral modules each of which is capable of executing one or more digital and/or analog functions which can each be selected separately, and function interconnection means for establishing the connections between the processing module and the pre-selected digital and/or analog functions located in at least one of the peripheral modules, identical to the specified functions of the specific integrated circuit, such that the replicator behaves in the same manner as the specific integrated circuit when the specific software is run.

BRIEF DESCRIPTION OF THE DRAWINGS

The objects, features and advantages of the invention will become more apparent from the following detailed description with reference to the drawings in which.

DETAILED DESCRIPTION OF THE INVENTION

Figure 1:
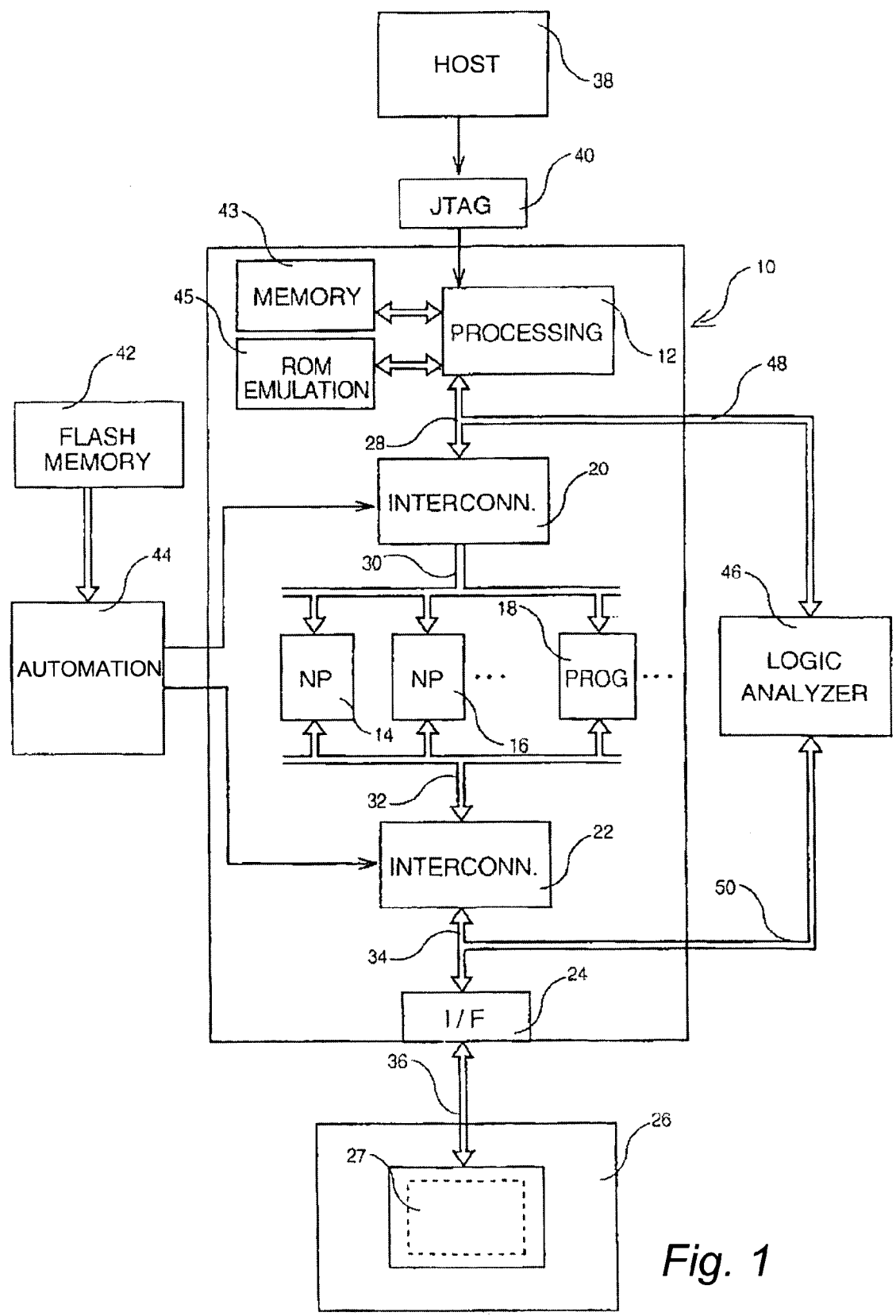
FIG. 1 is a block diagram representing the functional replicator according to the invention as well as the other components needed to make it operate as an emulation, prototyping or development device.

As shown in FIG. 1, the functional replicator 10 according to the invention primarily includes a processing module 12 connected to peripheral modules 14, 16 or 18 by means of a function interconnection module 20, as well as to an input/output interconnection module 22 at the output of the peripheral modules and an interface 24 which allows the functional replicator to be connected to the application board 26.

The processing module 12 is a conventional central processing unit (CPU type), generally in the form of a silicon chip, although not having the functions that are normally an integral part of an integrated circuit. All of the internal connections that are normally built into the integrated circuit take the form of external connections here, represented globally by the bus 28, referred to hereinafter as the internal bus. Therefore, the processing module 12 occupies a much larger place than the chip which will contain the specific integrated circuit which is functionally reproduced, as it features many more connections to the outside (approximately 400) than the final chip (approximately 150).

The peripheral modules are integrated circuits containing, on a single chip, a plurality of functions that can be implemented in a specific integrated circuit. The modules are divided into two categories: non-programmable (NP) modules, such as modules 14 or 16, and programmable modules (PROG) such as module 18. The non-programmable modules are circuits each having several tens of digital and/or analog functions. Classic digital functions are, for example: a time pulse generator or Timer, a USART (Universal Synchronous Asynchronous Receiver Transmitter) function, or the ADC specific function that is a communication protocol used in industry and in the automotive sector. For example, conventional analog functions are analog-digital converters (ADC) or digital-analog converters (DAC), operational amplifiers or analog comparators. The device according to the invention provides a number of such functions in order to accommodate all functions possible to allow the specific integrated circuit to be adapted to the targeted application and to evolve with the applications, since the device according to the invention can be reprogrammed at will so that it corresponds to, a new application. As for the programmable modules, they are generally provided with the expected digital functions through the programming of FPGA type programmable logic arrays.

Function interconnection means such as an interconnection matrix within a module 20 can be programmed to connect, through the first connection bus 30, the lines of the internal bus 28 to certain functions of at least one of the peripheral modules 14, 16 or 18 corresponding to the functions that will be built into the final integrated circuit. Note that the interconnection means can be integrated in the peripheral modules rather than included in a standalone module.

The input/output interconnection module 22 is an interconnection matrix programmed in the same way as the function interconnection means to connect the outputs of the functions selected in the peripheral modules using a second connecting bus 32, to the output bus 34. The output bus 34 may be connected to the application board using a ribbon cable 36 and an interface circuit 24. In fact, the ribbon cable 36 is connected to the output connections of the built-in circuit 27 that was not yet incorporated onto the board 26 (it is represented on the figure by dashed lines). This allows the device 10 to serve as an emulation device when the ribbon cable 36 is connected to the board 26.

The functional replicator 10 is connected to a host computer 38 by a JTAG type serial interface 40 that allows the computer code to be downloaded to the processing module for software testing and debugging.

For each specific integrated circuit to be emulated, the functional replicator must be configured to identically reproduce the functions of the integrated circuit. To accomplish this, an IIDI, (Hardware Description Language) program is developed according to the functions to be selected. The code obtained, supplied by the host computer 38, is stored in a Flash type memory 42. Then, by wring the memorized code, a programmable automaton 44 performs the series/parallel conversion of the code and begins programming the configuration by activating the appropriate connections in interconnection module 20 first, then in interconnection module 22.

The functional replicator 10 also features a memory module 43 and a ROM emulation module 45, both of which are connected to the processing module 12. The memory module is used to store the software which will be used for the application and which is transmitted to the processing module 12.

The ROM emulation module 45 is used to offset the problem resulting from the fact that it is difficult to use the memory module 43 to emulate the ROM of the integrated circuit inasmuch as the access time is not the same and the width of the memory bus (16-bit) is different from the 32-bit width used internally. As a result, the module 45 is an SSRAM memory having the same type of access as the ROM (32-bit and fixed address) with the same access time (1 cycle in read mode), A signal allows booting on the module 45, which enables the exact operating conditions of the future ROM to be reproduced and thus to validate the entire software before recording it definitively in the silicon, thereby reducing the risks involved in creating a specific integrated circuit with ROM.

Finally, a logic analyzer 46 may be connected to the internal bus 28 through a first exterior bus 48 and to the output bus 34 through a second exterior bus 50. During the test phases, the logic analyzer 46 is used to check that the function replicator 10 and the board 26 are operating correctly in terms of both the hardware and the software.

The connections of the logic analyzer with the functional replicator 10 allow all of the signals that normally exit the integrated circuit to be correlated. Furthermore, the split architecture of the device 10 also allows the signals internal to the circuit on the internal bus 28 to be monitored and thus to see all of the interactions in real time between the code, the input/output interconnection module 22 and numerous internal signals such as interruptions of the modules and the peripheral bus, etc.

Figure 2:
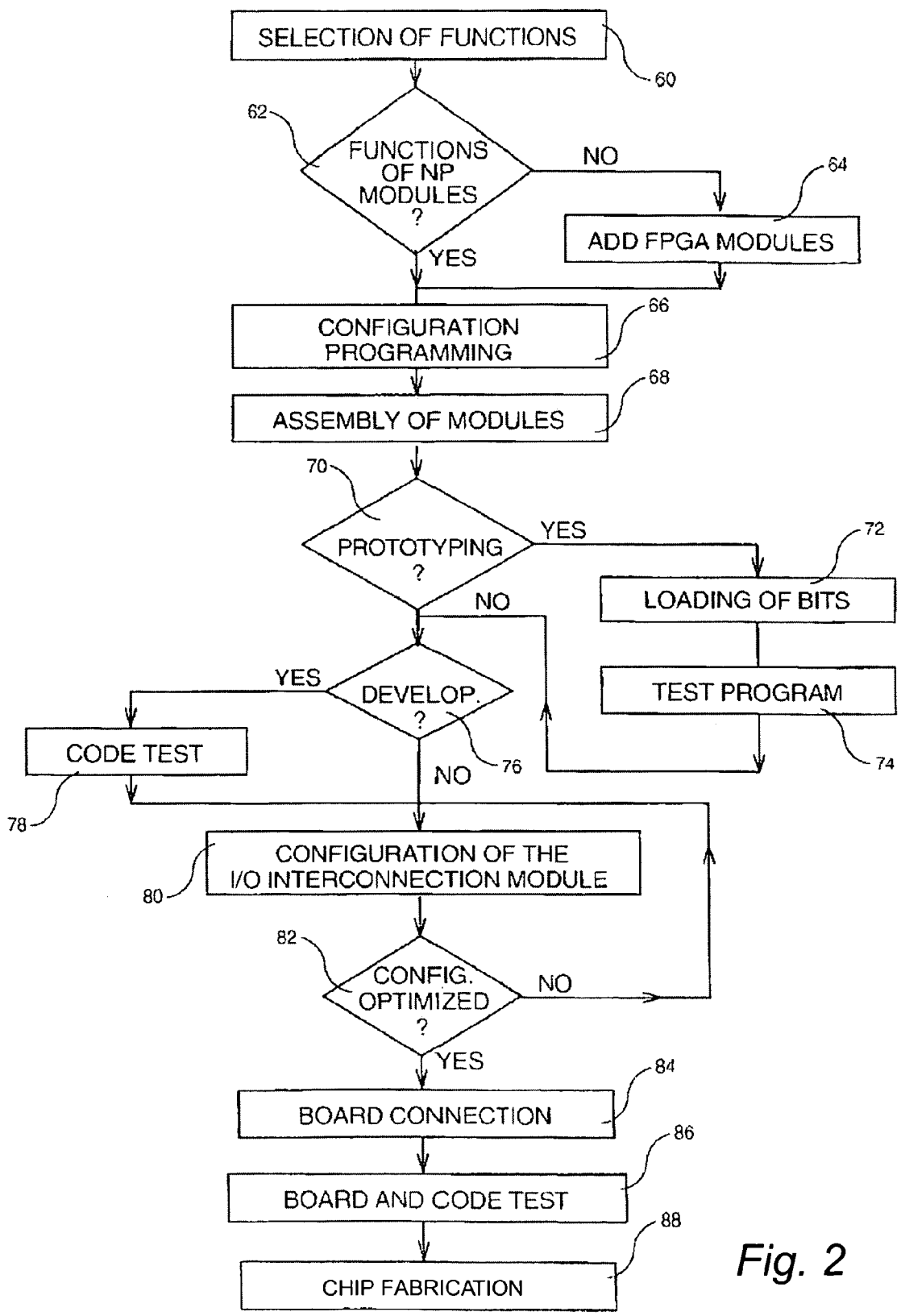
FIG. 2 represents a flowchart of the steps needed for the implementation of the functional replicator according to the invention, as an emulation, prototyping or development device.

The implementation of the functional replicator according to the invention, for which the various steps are shown by the flow chart in FIG. 2, begin with the definition and the selection of the functions (60) which are to be incorporated into the specific integrated circuit to be made. Selecting the non-programmable peripheral modules containing the desired functions makes this selection. The question remains, however, to know if these functions are all contained in the NP modules (62). If this is not the case, the missing functions must be added by programming one or more FPGA modules (64). This programming operation is generally made using a controller that programs the functions of the FPGA module when it is turned on owing to the code that was developed beforehand in a workstation.

When the functions have been selected, the next step entails establishing the IIDL language programming (65) which will enable the desired configuration to be obtained, as a result of the previous function selection. The code obtained is stored in flash memory 42. This code is used to carry out the assembly of modules of the functional replicator by being run by the controller 44 that configures the function interconnection module (68).

The next step consists in determining if we want to use the device as a prototyping device (70) to obtain a specific integrated circuit prototype. If so, the bits are loaded into the processing module 12 by means of the host computer 38 (72) and an appropriate test program is made (74).

The next step consists in determining if we want to use the device of the invention as a development platform (76). If so, we test at least a portion of the code that will be used in the application (78). The functional replicator according to the invention that has its own clock (not shown), its own memory 43 and its own features 14, 16, 18, is thus autonomous. It allows the application software's algorithms to be tested and the modification of its PLL allows the performances of the algorithms to be evaluated in real time. Furthermore, some functions are connected to standard outputs and thus may be stimulated by external devices such as terminals and other communication interfaces. In addition, they can be viewed on the screen of the logic analyzer.

It should be noted that when the device according to the invention is used as a prototyping device, the user (designer) runs all the functions of the peripheral modules, while, when the device is used as a development platform, the user (computer specialist) runs the software to test his/her algorithms, the interaction between the software and the integrated circuit and the software's performance.

Then, we continue to the next step that consists in configuring the input/output interconnection module (80)) in order to obtain output connections that are identical to those of the integrated circuit to be built. The test allows us to determine if the input/output interconnection module is optimized (82). If not, the input/output interconnection module is configured once again with the parameters corrected on the basis of the test performed.

When the input/output interconnection module is optimized, the functional replicator is connected to the application board (84). Then the board and application code are tested (86) before fabrication of the specific integrated circuit is launched (88). It should be noted that this fabrication process might be undertaken at an earlier stage, once the configuration has been optimized, for example.

Figure 3:
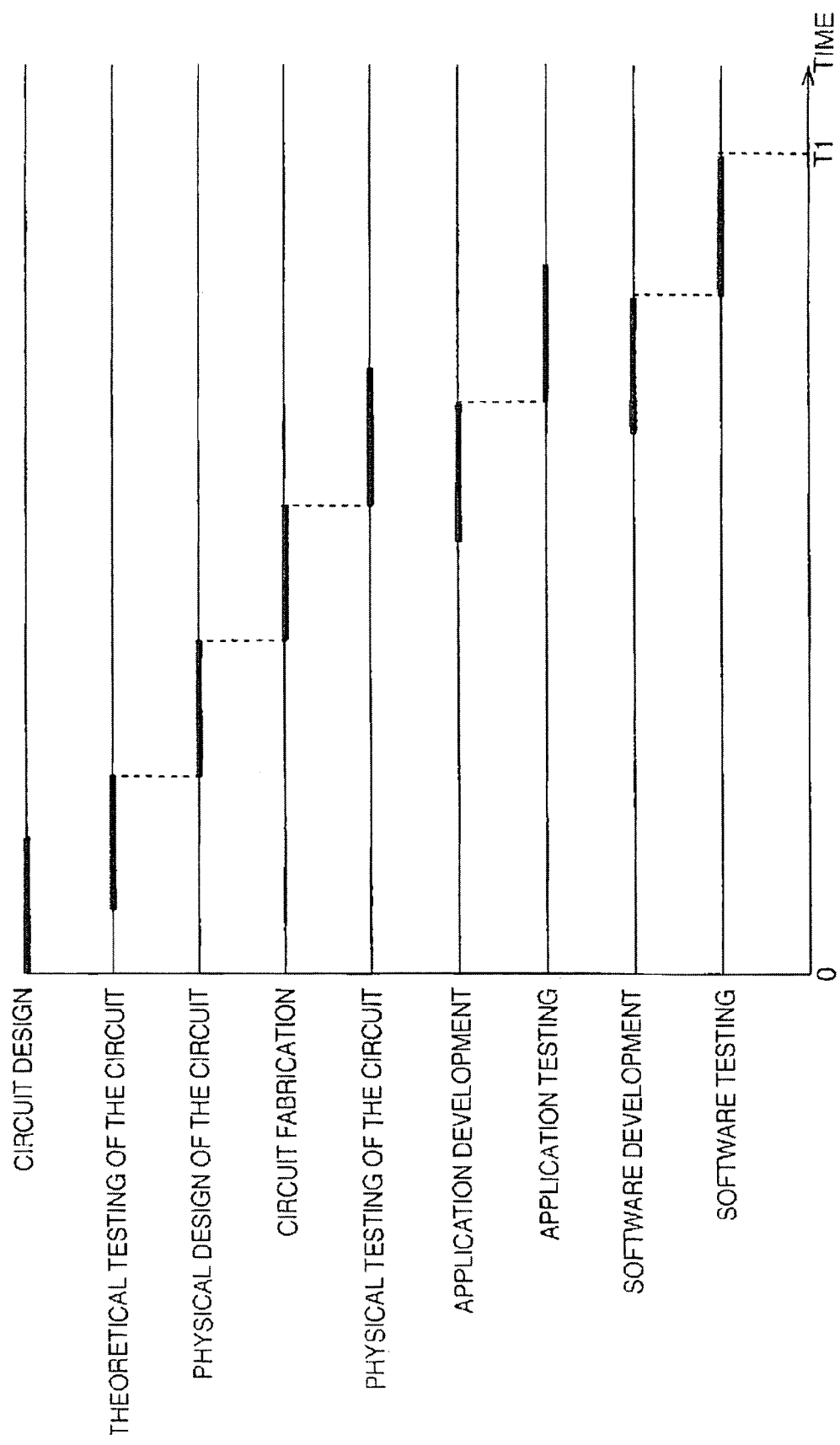
FIG. 3 is a time-based diagram showing the various phases which come into play in the fabrication and development of an application board when the prior art technique is used.
Figure 4:
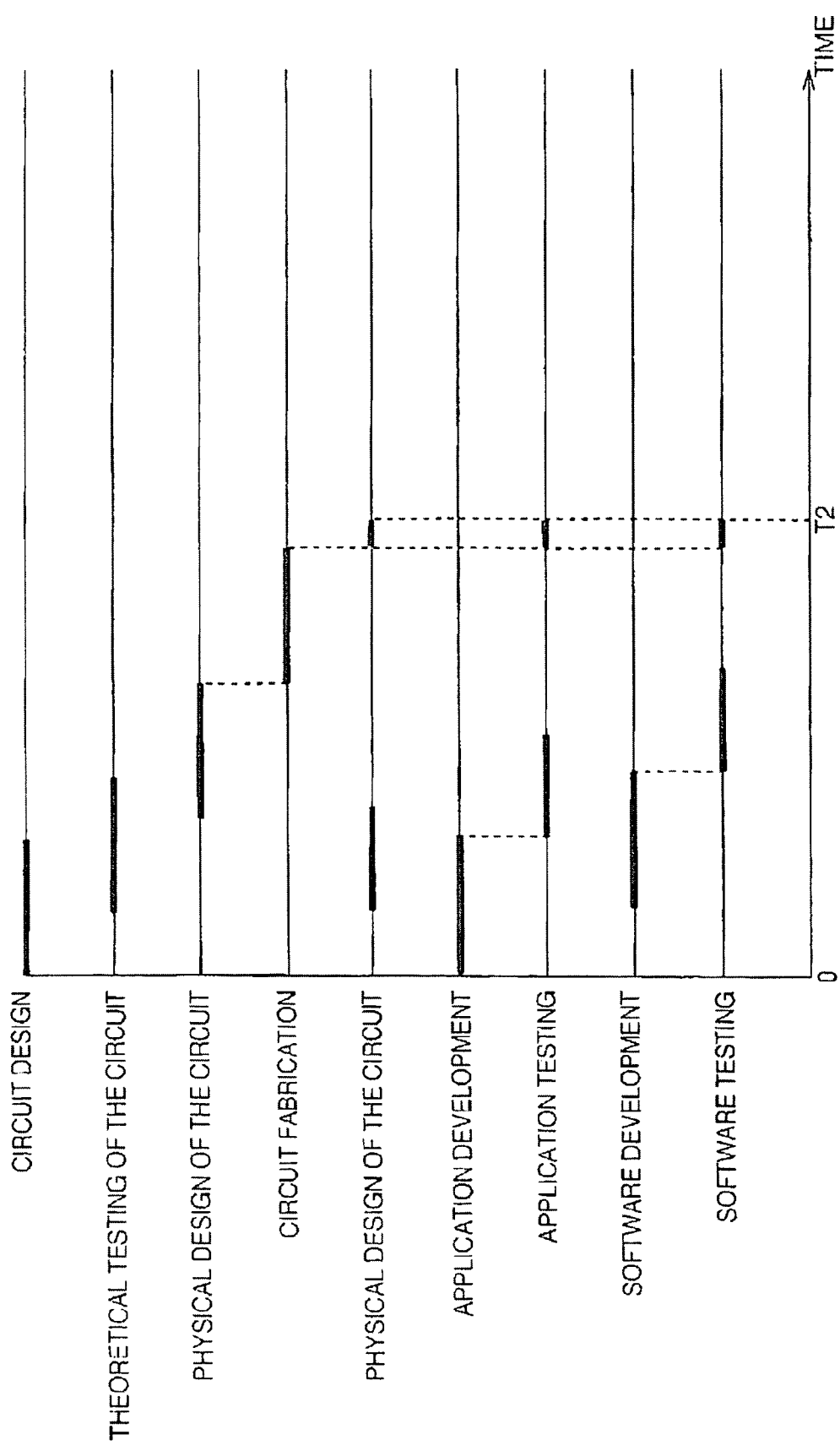
FIG. 4 is a time-based diagram showing the various phases that come into play in the development of an application board when the functional replicator according to the invention is used.

As shown in FIG. 3, the conventional method of fabrication requires that the application be tested when the integrated circuit is operational, that is to say, after fabrication. The development of the application thus only begins very late in the overall process. The same is true for the software that is developed at the end of the process. Owing to the use of the functional replicator according to the invention, the length of the application board development process is considerably reduced. Indeed, as shown in FIG. 4, the development of the application may begin at the same time as the design of the integrated circuit without waiting for it to be fabricated as testing of the application can be started once the integrated circuit has been designed and after its functional reproduction has been validated by the device of the invention. The same is true for the software. Qualification tests are sometimes necessary as shown in FIG. 4, after the integrated circuit is fabricated. If the end of the development process is located in time T1 with the conventional method, the end of the same process is situated at time T2 by using the device according to the invention, time T2 which is lower than time T1 by mole than 40%.

What is claimed is:

1. A real time functional replicator (10) of a specific integrated circuit comprised of a processing unit and peripherals in order to perform specific digital and/or analog functions controlled by specific software, said specific integrated circuit being designed to be incorporated into a specified application board; said replicator device comprising:

a processing module (12) that is functionally identical to said processing unit of said specific integrated circuit, a plurality of peripheral modules (14, 16, 18) each able to implement one or more digital and/or analog functions, each of said functions being able to be selected separately, and function interconnection means (20) for establishing the connections between said processing module and one or more digital and/or analog functions previously selected and located in at least one of said peripheral modules, said functions being identical to said specific functions of said specific integrated circuit, such that said replicator behaves identically to said specific integrated circuit when said specific software is run.

2. The device according to claim 1, wherein said function interconnection means are included in a standalone module (20).

3. The device according to claim 2, in which said function interconnection module (20) is connected to said processing module (12) through an internal bus (28) grouping together the internal connections of said specific integrated circuit between its processing unit and its peripherals.

4. The device according to claim 2, in which said function interconnection module (20) is configured by a programmable automation (44) using software set up when said digital and/or analog functions, which must be implemented by said peripheral modules (14, 16, 18), have been selected.

5. The device according to claim 1, wherein said interconnection means are integrated within said peripheral modules (14, 16, 18).

6. The device according to claim 1, in which said peripheral modules feature one or more integrated circuits (14, 16) each of which are specially designed to implement a plurality of digital and/or analog functions.

7. The device according to claim 6, in which said peripheral modules also include one or more FPGA type programmable logic arrays (18) which were previously programmed to implement at least one digital function which is not implemented by said integrated circuits (14, 16) specially designed to implement the digital and/or analog functions.

8. The device according to claim 7, featuring an input/output connection module (22) and an interface (24) connected to said input/output interconnection module by an input/output bus (34) and which can be connected to the input/output pins of the said input/output interconnection module establishing the connections between the outputs of the digital and/or analog functions previously selected of said peripheral modules (14, 16, 18) and said interface.

9. The device according to claim 7, in which said input/output interconnection module (22) is configured by said programmable automation (44) by means of said software set up when said digital and/or analog functions were selected.

10. The device according to claim 1, further including a ROM emulation module (45) connected directly to said processing module (12) to emulate the ROM memory of said specific integrated circuit, said ROM emulation module having the same type of access and the same access time as said ROM memory.

11. The device according to claim 10, wherein said ROM emulation module comprises a SSRAM memory.

12. A method for emulating a specific integrated circuit designed to be incorporated into a specified application board, said method comprising providing an application board having input/output pins for said integrated circuit, connecting a device according to claim 1 to said input/output pins.

13. The method according to claim 12, wherein said interface is connected to the input/output pins of said specific integrated circuit by a ribbon cable.

14. A method for testing a prototype of an integrated circuit, comprising providing a device according to claim 1, loading information into processing module (12) from a computer, and testing said device.

15. A method for developing an integrated circuit, comprising providing a device according to claim 1, loading software into processing module (12), and running said software to test interactions between the software and the integrated circuit.

* * * * *